Sept. 7, 1937.  P. R. McCRARY  2,092,553
PLOW
Filed March 19, 1936  2 Sheets-Sheet 1
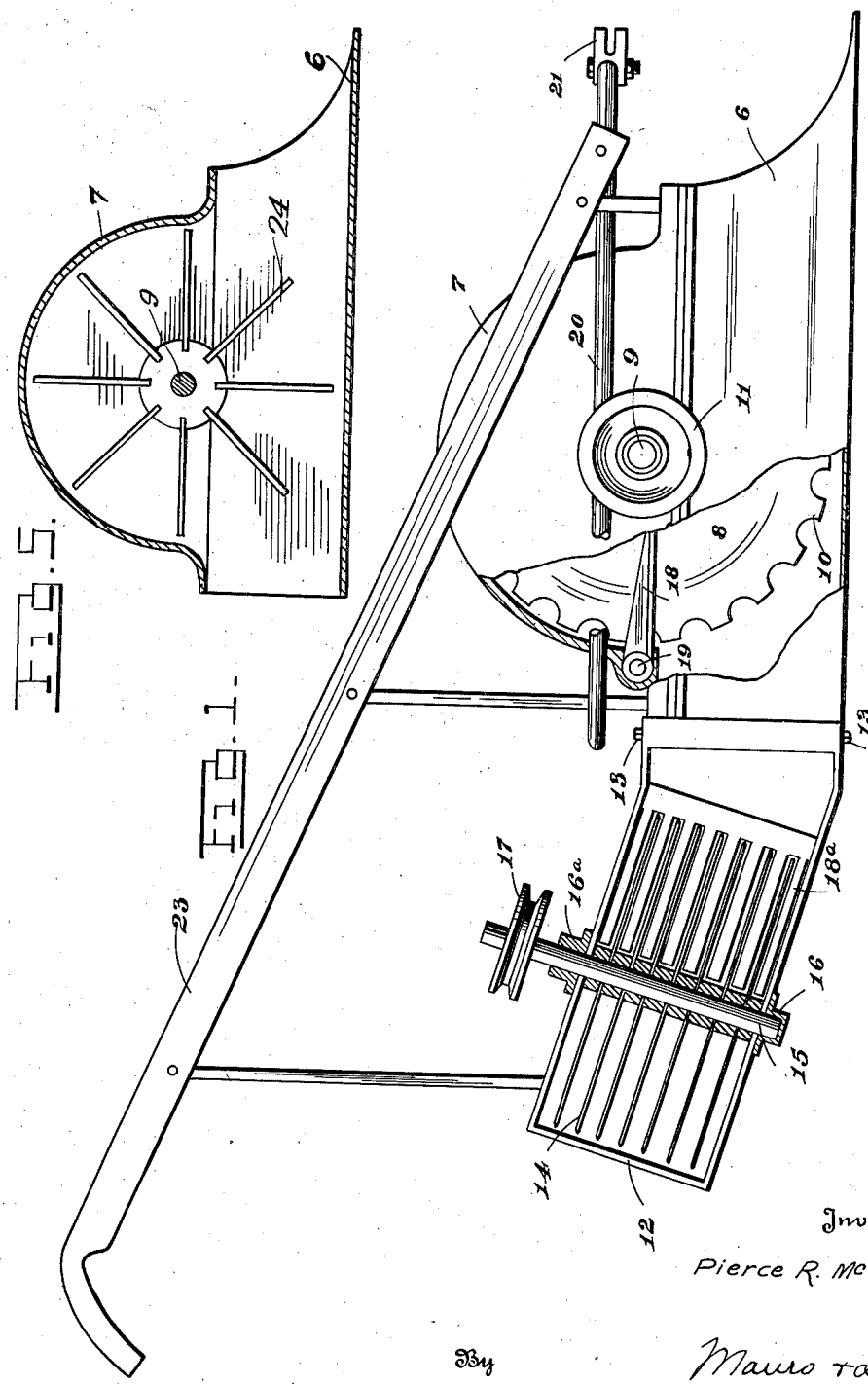
Inventor
Pierce R. McCrary
By Mauro + Lewis
Attorneys Sept. 7, 1937.    P. R. McCRARY    2,092,553
PLOW
Filed March 19, 1936    2 Sheets-Sheet 2
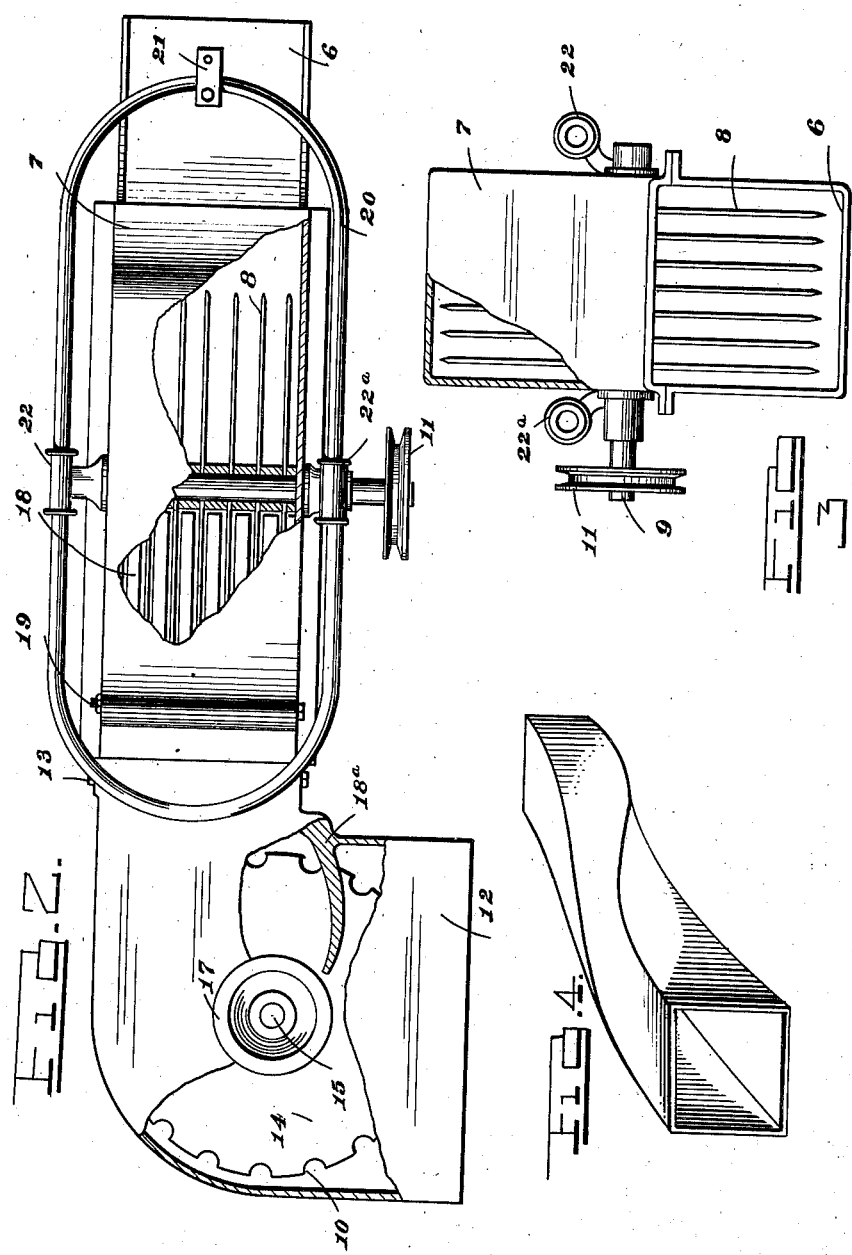
Inventor
Pierce R. McCrary
By Mauro & Lewis
Attorneys Patented Sept. 7, 1937

2,092,553

UNITED STATES PATENT OFFICE 2,092,553

PLOW

Pierce R. McCrary, York, Pa.

Application March 19, 1936, Serial No. 69,700

17 Claims. (Cl. 97—43)

This invention relates to agricultural implements, and more particularly to plows and combination plow-harrows.

The chief object of the invention is to provide a plow which requires much less power for its operation than plows now in general use.

A further object is to provide a plow which not only turns over the ground but also comminutes it, thus combining the functions of a plow and a harrow or cultivator.

A still further object is to provide a plow which will cut up the roots of grasses and weeds and the nests of harmful insects while it is at the same time preparing the ground for agricultural purposes.

Other objects of the invention will appear in what follows.

Several embodiments of the invention will now be described, as non-limiting examples, in connection with the accompanying drawings, in which—

Figure 1 is a side view partly in vertical section;

Figure 2 is a plan view partly in horizontal section;

Figure 3 is a front view;

Figure 4 is a perspective view of a detail; and

Figure 5 is a side view in vertical section of a paddle wheel attachment which may be used for certain purposes instead of the disks shown in the other figures.

The plow share of this invention differs greatly in form from that of the conventional plow, being hollow and preferably of approximately rectangular shape in cross-section and having an open, scoop-like advancing edge 6, which is sharpened on its sides and bottom to a knife-edge, these features being illustrated in Figs. 1 and 3. The implement shown in Fig. 1 comprises instrumentalities which adapt it for simultaneous plowing and harrowing. Thereby the section of soil cut out by the front scoop-like edge 6 passes into the chamber under the cover 7, wherein are the disks 8 carried on and secured to shaft 9. These disks are preferably formed, as shown, with circumferential teeth, and are sharpened on their circumferences and also on the edges 10 of said teeth. They are caused to revolve by power applied to belt pulley 11 on shaft 9. By these means the earth is cut into vertical slices as it passes through chamber 7.

From chamber 7 the earth passes into chamber 12, which is preferably detachable from the body of the plow and is fastened thereto by suitable means such as bolts 13. This chamber also has a set of disks 14, which may be similar in construction and operation to disks 8. Disks 14 are secured on shaft 15, which can be rotated in bearings 16 and 16a by the application of power to belt pulley 17. Disks 14 are disposed approximately at right angles to disks 8. Thus the vertical slices of earth coming from chamber 7 are sliced horizontally and thereby are very finely divided. They are then discharged through spout 12.

The cutting disks may be kept from clogging by suitable means such as the cleaning fingers 18 and 18a. Said fingers are removable and are attached as shown by means of bolts 19. They may be straight as shown at 18 or curved as shown at 18a.

The main frame 20 of the plow carries the attachment 21 to which the pulling force is hooked and is connected to the hollow section 7 by means of clamps 22 and 22a. The plow is guided by the conventional pair of handles 23.

It will clearly be seen from the above description that the use of this invention in plowing will result in complete comminution of the earth and masceration of any and all grass and weed roots, insect nests and so forth, and will thus greatly facilitate the preparation of the ground for planting. In ordinary use both sets of disks should be revolved at a speed only slightly in excess of the speed of the passage of the earth through the plow; but, if desirable, this speed can be increased so as to throw the earth out of spout 12 to a distance of several feet, and the resulting contact of the finely divided earth with the air will greatly improve it for agricultural purposes by enabling it to absorb nitrogen from the air.

It is possible to use the plow without having power rotation of the disks. In this event either disks 14 may be removed from chamber 12, in which case the earth will be forced out at the side; or the whole chamber 12 may be detached and the earth, which will be cut into vertical slices by its passing through disks 8, will come out directly behind the plow. When the plow is used in this fashion, disks 8 will revolve simply from the action of the passage of the earth through chamber 7 and will require no power on pulley 11.

If the soil to be plowed is rocky or if it is desired merely to turn it over in the manner of an ordinary plow, all the disks may be dispensed with. Then in place of chamber 12, a corkscrew spout, such as that illustrated in Fig. 4, could be used to turn over the earth as it comes through the plow. With this spout turned upward, the invention can be used in this manner for hilling. Similarly, the invention may be employed for digging shallow ditches for irrigation or like purpose.

The construction shown in Fig. 5 is specially adapted for use in cleaning out irrigation ditches or in surface irrigation. Instead of disks 8, a paddle wheel such as that illustrated may be substituted. Power is applied to said wheel by means of pulley 11, and the implement is drawn rapidly through the ditch to be cleared. The revolving paddles 24 will force out the clogging matter, and by using a long spout set at an angle all this undesirable matter will be deposited outside of the ditch.

Use of the implement as described in the next preceding paragraph in an irrigation ditch filled with water will result in increasing the flow of water therein and will also assist in spreading the water over the nearby ground.

What is claimed is:—

1. A plow, comprising in combination a plow share of scoop-like form and means comprising a twisted spout for turning over the section of earth cut out by said share.

2. A plow, comprising in combination a plow share of scoop-like form, means for slicing the section of earth cut out by said share and means comprising a twisted spout for turning over the resulting slices.

3. A plow, comprising a hollow frame or body having sides and a bottom provided with cutting edges forming a scoop-shaped plow share; and means for slicing the section of earth cut out by said share.

4. A plow, comprising in combination a hollow frame or body having sides and a bottom provided with cutting edges forming a scoop-shaped plow share; means for slicing the section of earth cut out by said share, said section being confined by the sides of said plow during the slicing operation; and means for turning over the resulting slices.

5. A plow, comprising in combination a hollow frame or body having sides and a bottom provided with cutting edges forming a scoop-shaped plow share; means comprising sharpened disks for slicing the section of earth cut out by said share, said section being confined by the sides of said plow during the slicing operation.

6. A plow, comprising in combination a hollow frame or body having sides and a bottom provided with cutting edges forming a scoop-shaped plow share; means comprising rotatable sharpened disks for vertically slicing the section of earth cut out by said share; and means for turning over the resulting vertical slices.

7. A plow, comprising in combination a plow share of scoop-like form, means for slicing the section of earth cut out by said share and means for slicing the resulting slices in a direction at an angle to the original slicing.

8. A plow, comprising in combination a plow share of scoop-like form, means for vertically slicing the section of earth cut out by said share, and means for horizontally slicing the resulting vertical slices.

9. A plow, comprising in combination a plow share of scoop-like form; means comprising sharpened disks for slicing the section of earth cut out by said share; and means for slicing the resulting slices in a direction at an angle to the original slicing.

10. A plow, comprising in combination a plow share of scoop-like form; means comprising rotatable sharpened disks for vertically slicing the section of earth cut out by said share; and means for horizontally slicing the resulting vertical slices.

11. A plow, comprising in combination a plow share of scoop-like form; sharpened disks for slicing the section of earth cut out by said share; and a second set of sharpened disks for slicing the resulting slices in a direction at an angle to the original slicing.

12. A plow, comprising in combination a plow share of scoop-like form; means comprising sharpened disks for slicing the section of earth cut out by said share, said disks being provided with teeth; and means for slicing the resulting slices in a direction at an angle to the original slicing.

13. A plow, comprising in combination a plow share of scoop-like form; sharpened disks for slicing the section of earth cut out by said share; and a second set of sharpened disks for slicing the resulting slices in a direction at an angle to the original slicing, both of said sets of disks being provided with teeth.

14. A plow, comprising in combination a plow share of scoop-like form; means comprising sharpened disks for slicing the section of earth cut out by said share, said disks being provided with cleaning means comprising finger-like projections extending in between the individual disks; and means for slicing the resulting slices in a direction at an angle to the original slicing.

15. A plow, comprising in combination a plow share of scoop-like form; sharpened disks for slicing the section of earth cut out by said share; and a second set of sharpened disks for slicing the resulting slices in a direction at an angle to the original slicing, both of said sets of disks being provided with cleaning means comprising finger-like projections extending in between the individual disks.

16. A plow, comprising in combination a hollow frame or body having sides and a bottom provided with cutting edges forming a scoop-like plow share; and a rotatory paddle wheel for forcing out of the furrow the soil separated out by said share.

17. A plow, comprising in combination a plow share of scoop-like form and means for forcing out of the furrow the soil separated out by said share, said means comprising a rotatory paddle wheel in conjunction with a twisted spout.

PIERCE R. McCRARY.